(12) United States Patent
Damle et al.

(10) Patent No.: US 7,590,150 B1
(45) Date of Patent: Sep. 15, 2009

(54) METHOD AND APPARATUS FOR TRANSPORT OF MULTIPLE TDM AND DATA CLIENTS OVER MULTIPLE VARIABLE DATA RATE STREAMS

(75) Inventors: Rajendra R. Damle, Plano, TX (US); Troy D. Robinson, Overland Park, KS (US); Robert K. Butler, McKinney, TX (US)

(73) Assignee: Ceterus Networks, Inc., Richardson, TX (US)

( * ) Notice: Subject to any disclaimer, the term of this patent is extended or adjusted under 35 U.S.C. 154(b) by 759 days.

(21) Appl. No.: 10/955,198

(22) Filed: Sep. 30, 2004

(51) Int. Cl.
*H04J 3/24* (2006.01)
(52) U.S. Cl. .................... 370/474; 370/412
(58) Field of Classification Search ............ 370/229, 370/230, 230.1, 232, 252, 253, 474, 476, 370/470, 472, 412
See application file for complete search history.

(56) References Cited

U.S. PATENT DOCUMENTS

| | | | |
|---|---|---|---|
| 5,680,400 A * | 10/1997 | York | 370/473 |
| 6,445,706 B1 * | 9/2002 | Fransson et al. | 370/395.42 |
| 6,629,147 B1 * | 9/2003 | Grow | 709/236 |
| 6,778,499 B1 * | 8/2004 | Senarath et al. | 370/232 |
| 6,961,326 B1 * | 11/2005 | Chang et al. | 370/338 |
| 6,982,991 B1 * | 1/2006 | Atoji | 370/474 |
| 7,324,522 B2 * | 1/2008 | Rosengard et al. | 370/395.4 |
| 7,408,939 B1 * | 8/2008 | Damle et al. | 370/395.1 |
| 2002/0191641 A1 * | 12/2002 | Lhermitte et al. | 370/468 |
| 2004/0196791 A1 * | 10/2004 | Davies et al. | 370/235 |
| 2004/0228285 A1 * | 11/2004 | Moon et al. | 370/252 |
| 2004/0264683 A1 * | 12/2004 | Bye | 379/402 |

* cited by examiner

*Primary Examiner*—Ricky Ngo
*Assistant Examiner*—Gary Mui
(74) *Attorney, Agent, or Firm*—Campbell Stephenson LLP

(57) ABSTRACT

Methods, apparatus, computer program products, and systems to transport multiple variable data rate LAN streams and fixed data rate voice streams through a plurality of variable data rate transmission links used as a conduit for transmission of data between each local area network are disclosed. Incoming data streams are placed within payload data units and distributed among the transmission links, which use a framed protocol. While the frame size for each transmission link varies dependent upon the transmission rate of that link, the number of payload data units within each frame remains constant.

39 Claims, 10 Drawing Sheets

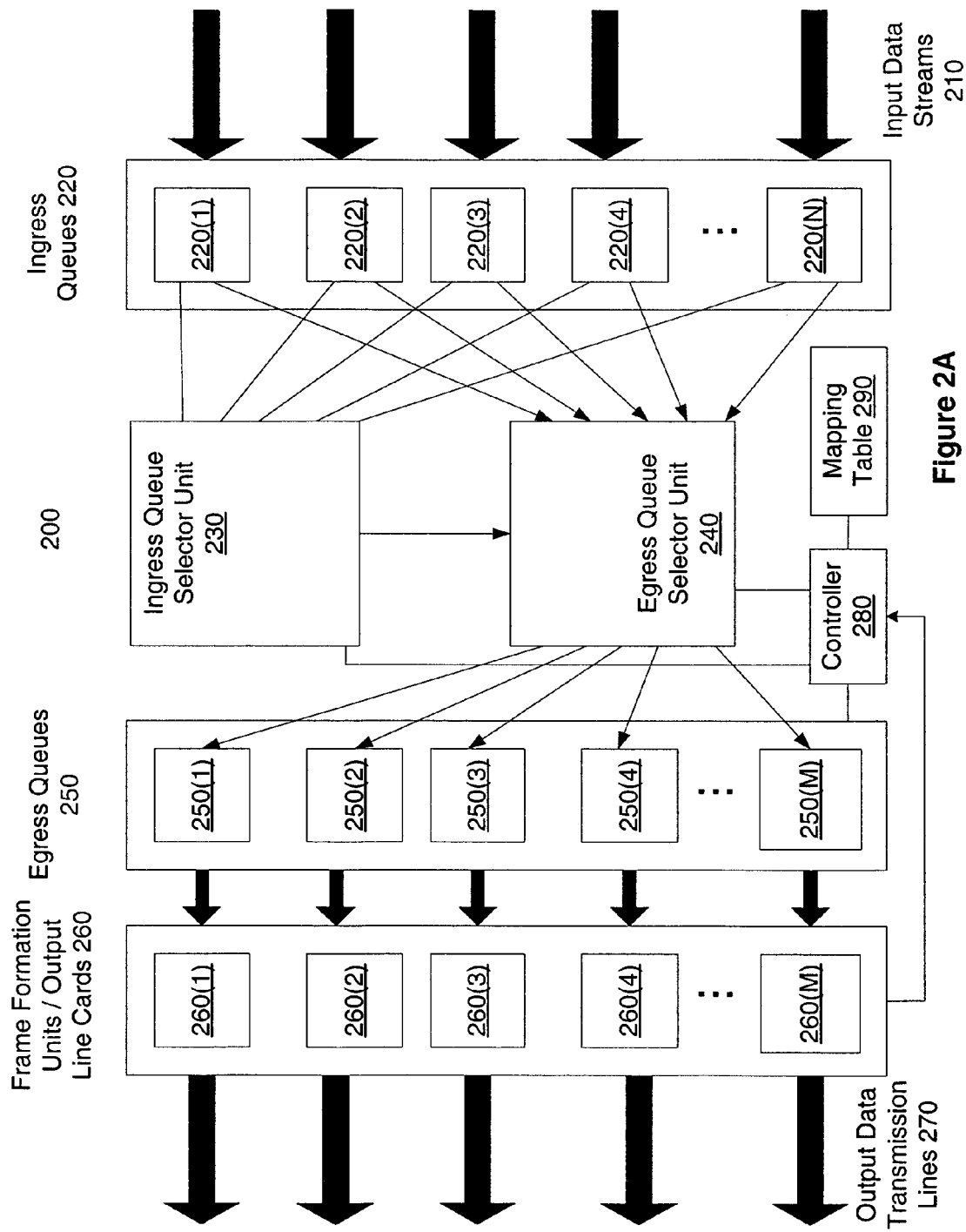

Mapping Table

| n (# B-Channels) | SHDSL Frame Length (Bytes) | PDU Length (Bytes) | Line Data Rate (kbps) |
|---|---|---|---|
| 3 | 144 | 24 | 192 |
| 4 | 192 | 32 | 256 |
| 5 | 240 | 40 | 320 |
| 6 | 288 | 48 | 384 |
| 7 | 336 | 56 | 448 |
| 8 | 384 | 64 | 512 |
| 9 | 432 | 72 | 576 |
| 10 | 480 | 80 | 640 |
| 11 | 528 | 88 | 704 |
| 12 | 576 | 96 | 768 |
| 13 | 624 | 104 | 832 |
| 14 | 672 | 112 | 896 |
| 15 | 720 | 120 | 960 |
| 16 | 768 | 128 | 1024 |
| 17 | 816 | 136 | 1088 |
| 18 | 864 | 144 | 1152 |
| 19 | 912 | 152 | 1216 |
| 20 | 960 | 160 | 1280 |
| 21 | 1008 | 168 | 1344 |
| 22 | 1056 | 176 | 1408 |
| 23 | 1104 | 184 | 1472 |
| 24 | 1152 | 192 | 1536 |
| 25 | 1200 | 200 | 1600 |
| 26 | 1248 | 208 | 1664 |
| 27 | 1296 | 216 | 1728 |
| 28 | 1344 | 224 | 1792 |
| 29 | 1392 | 232 | 1856 |
| 30 | 1440 | 240 | 1920 |
| 31 | 1488 | 248 | 1984 |
| 32 | 1536 | 256 | 2048 |
| 33 | 1584 | 264 | 2112 |
| 34 | 1632 | 272 | 2176 |
| 35 | 1680 | 280 | 2240 |
| 36 | 1728 | 288 | 2304 |

Figure 7

METHOD AND APPARATUS FOR TRANSPORT OF MULTIPLE TDM AND DATA CLIENTS OVER MULTIPLE VARIABLE DATA RATE STREAMS

FIELD OF THE INVENTION

This invention relates to the field of information networks, and more particularly relates to a method and system for conveying information over a variable-bandwidth, frame-based network.

BACKGROUND OF THE INVENTION

A small- to medium-sized enterprise typically needs two types of connections and services from a network service provider. First is voice or telephone service and second is data service, which is most commonly internet connectivity. Data service typically has a high-bandwidth requirement (in the Mb/s range) and demand typically grows rapidly as the business grows. While voice service demands typically do not grow as quickly as those of data service, voice service requires little-to-no delay in transmission of signals.

Over 90% of the buildings that house a typical small- to medium-sized enterprise are physically connected to a network provider's central office through a bundle of multiple twisted copper pairs. Thus, network service providers need to leverage the copper access by utilizing all the available copper pairs to the fullest in order to economically provide bandwidth for growing data service demands.

Today there are two types of transmission technologies and protocols widely used to transmit a bit stream over a copper pair: T1 and DSL (Digital Subscriber Loop). T1 is a constant 1.544 Mbps stream developed to transport 24 digitized voice channels (DSOs). DSL encoding is a variable data rate transmission technology that optimizes a line's data rate by taking into account the distance the signal is to be transmitted and the signal-to-noise ratio at the receive end. DSL technology is cheaper than T1 for dry copper loop-only applications, and is therefore economically favored.

An expanded bandwidth can be realized if multiple copper pairs are used to transmit data. Such an arrangement can be realized through the formation of a multiple DSL connection link between a transmit and receive node. Therefore, there is a need for a versatile bonding technology that can form a large bandwidth link using multiple variable bandwidth transmission technologies and capable of reliably transporting multiple high data rate data traffic as well as voice traffic through the link.

SUMMARY OF THE INVENTION

Methods, apparatus, computer program products, and systems have been discovered to transport multiple variable data rate LAN streams and fixed data rate voice streams through a plurality of variable data rate transmission links used as a conduit for transmission of data between local area networks. Incoming data streams are placed within payload data units and distributed among the transmission links, which use a framed protocol. While the frame size for each transmission link varies dependent upon the transmission rate of that link, the number of payload data units within each frame remains constant.

Accordingly, one embodiment of the present invention provides a method for transmitting data is disclosed. The method includes forming a payload data unit (PDU) from an input data stream, wherein the amount of data within the PDU is dependent upon the data rate of an output data line. An output frame is formed from the PDU.

Another embodiment of the present invention provides an apparatus comprising a means for forming a PDU from an input data stream, wherein the amount of data in the PDU is dependent upon the data rate of an output data transmission line. The apparatus further comprises a means for forming an output frame from the PDU.

A further embodiment of the present invention provides a computer program product comprising signal bearing media bearing programming adapted to form a PDU from an input data stream and to form an output frame from the PDU. The PDU contains an amount of data that is dependent upon the data rate of an output data transmission line.

In another embodiment of the present invention, a transport unit is provided. The transport unit includes a frame formation unit and a PDU formation unit configured to form a PDU. The PDU comprises an amount of data that depends upon the data rate of an output data transmission line.

In yet another embodiment of the present invention, a transport unit is provided. The transport unit comprises a plurality of egress queues and an egress queue selector unit. The length of space used to store data within each egress queue is based upon the data rate of an output data transmission line corresponding to the egress queue. The egress queue selector unit is configured to select one of the plurality of egress queues and to transmit a quantity of data from a data stream sufficient to fill the length of space used to store data within the selected egress queue.

In a further embodiment of the present invention, a transport unit is provided. The transport unit comprises a mapping table unit configured to store a mapping table. The mapping table comprises a first and second value. The first value is a data rate of an output data transmission line and the second value is an amount of data within a PDU destined for the output data transmission line.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

FIG. 2A is a block diagram illustrating control flow of a transmit module of a transport unit according to the present invention.

FIG. 7 is a mapping table mapping the number of SHDSL B-channels ("n") to SHDSL frame length, line data rate, and PDU length according to the present invention.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Introduction

The present invention provides for the conveyance of data streams in a variable-transmission-rate frame-based communications environment by first translating data streams into an intermediate format (payload data units, or PDUs), and then aggregating the PDUs thus formed into frame-based data streams.

A universal transport platform (UTP) is defined that enables multiple data streams to be simultaneously transported across multiple long distance transmission links with inherent protection. A UTP according to the present invention is indifferent to all existing and future framing protocols and data rates. This indifference enables a universal transport system (UTS, or transport unit) according to the present invention to be built that is specific to access, metro or core network applications.

An Example Network Element Architecture

Figure 1:
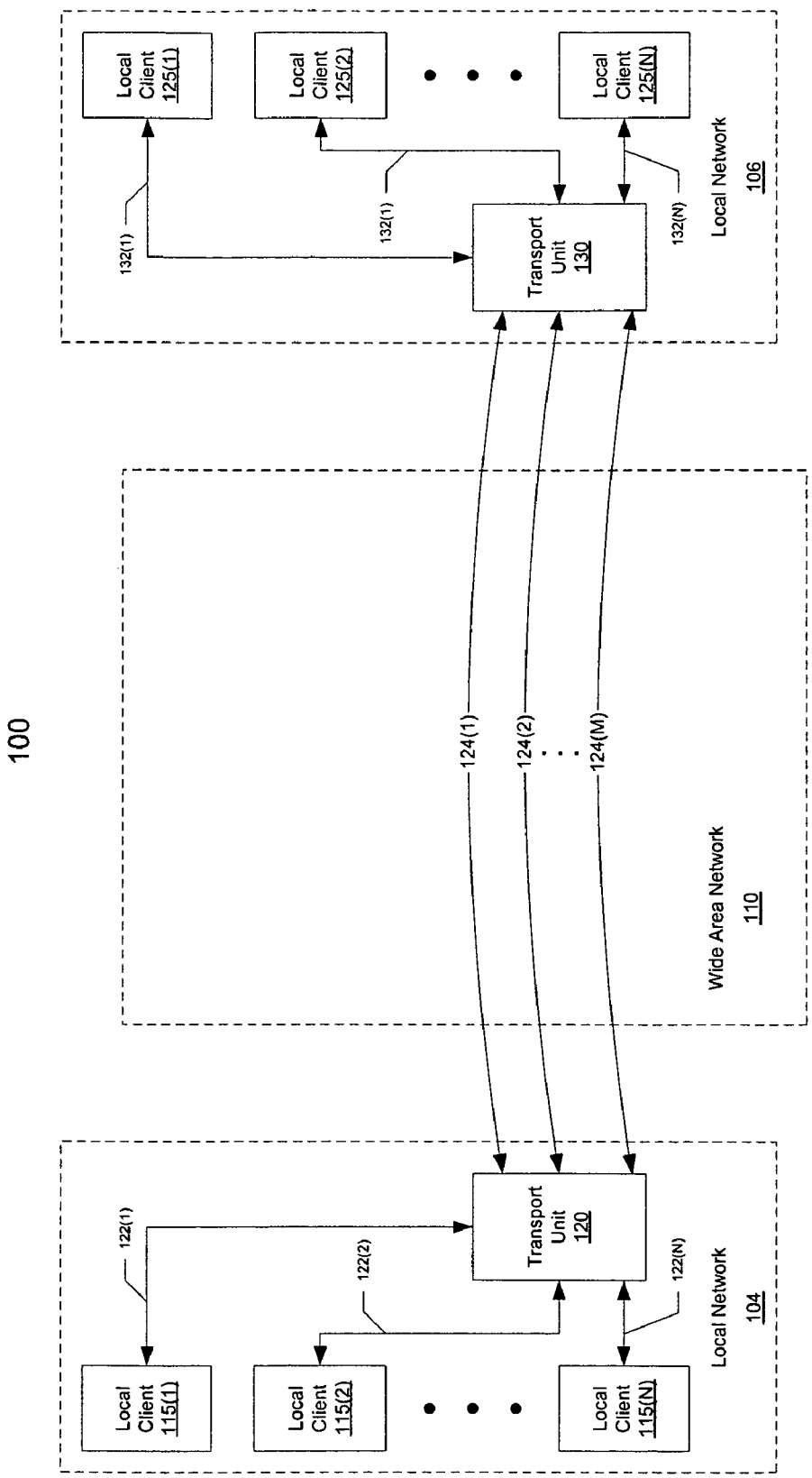
FIG. 1 is a block diagram illustrating a network employing an architecture supported by embodiments of the present invention.

FIG. 1 is a block diagram illustrating a network 100 that employs an architecture supported by embodiments of the present invention. Network 100 includes local networks 104 and 106. Local networks 104 and 106 communicate with one another via a core network 110. Local network 104 includes a number of local clients (depicted as local clients 115(N)), which are coupled to a transport unit 120 via communication lines 122(1)-(N). In turn, transport unit 120 is coupled to core network 110 by communication lines 124(1)-(M). Communication lines 122(1)-(N) can carry data in packet format or as streams of data. In contrast, using such an embodiment, data carried by communication lines 124(1)-(M) are transported using a frame-based protocol (i.e., a protocol in which the data being transported is loaded into frames).

Similarly, local network 106 includes a number of local clients (depicted as local clients 125(1)-(N)) which are coupled to a transport unit 130 via a number of communication lines (depicted as communication lines 132(1)-(N)). Also in a manner similar to that previously discussed, transport unit 130 is coupled to core network 110 via a number of communication lines 124(1)-(M). As before, communication lines 132(1)-(N) can carry data in a packetized format or as streams of data, while communication lines 124(1)-(M) carry data in a frame-based format.

Providing communications between local networks 104 and 106, wide area network 110 supports such communications via a number of communication links 124(1)-(M). As will be apparent to one of skill in the art, wide area network 110 can be configured in any of a number of topologies, and employ any one of a number of protocols for transferring the frame-based data received from local networks 104 and 106 to one another. In the topology depicted in FIG. 1, communication links 124(1)-(M) can be implemented, for example, using symmetric high bit rate digital subscriber loop (SHDSL) protocol.

It will be noted that the variable identifier "N" is used (as are the variable identifiers "M", "J", "K" and so on) in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing describes an embodiment wherein the different components are contained within different other components (e.g., the various elements shown as components of network 100). It is to be understood that is merely an example, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

An Example Network Element

FIG. 2 is a block diagram illustrating control-level flow of the major components of the transmit module of a transport unit such as transport units 120 and 130, and depicted in FIG. 2 as a transport unit 200. Transport unit 200 includes, generally, a set of ingress queues 220 to receive data from input data streams 210, an ingress queue selector unit 230, an egress queue selector unit 240, a set of egress queues 250, and a set of frame formation units 260, that form frames to be transmitted along corresponding output data transmission lines 270.

Input data streams 210 represent data that is received from clients on a local area network. Data from a local area network can be in a variety of protocols, including, but not limited to, packet-based protocols (Ethernet) and frame-based protocols (T1 or E1). In some embodiments, a number of ingress queues 220 corresponds to a number of clients, although this need not be the case. Each ingress queue 220(1)-220(N) is configured to contain a chosen amount of data from a corresponding input datastream, while the ingress queue awaits processing by an ingress queue selector unit 230. Each ingress queue can additionally have a corresponding priority associated with the ingress queue, depending upon various parameters, including quality of service.

As data is queued in ingress queues 220, ingress queue selector unit 230 selects queues that are ready for further processing. In one embodiment, ingress queue selector unit selects queues on the basis of a strict-priority round-robin technique (discussed below). The ingress queue selector unit selects ingress queues in a manner designed to minimize delay in processing incoming data while ensuring that data is prioritized appropriately. The ingress queue selector unit also takes into consideration information received from a controller 280 related to size of a payload data unit to be formed in a selected egress queue (discussed below). An ingress queue selector unit subsequently passes information related to the selected ingress queue to an egress queue selector unit 240 when the egress selector unit is ready to process the outgoing data.

The role of egress queue selector unit 240 is to fill egress queues 250(1)-250(M) as each becomes available, and to provide an appropriate header for the data in each egress queue. Egress queue selector 240 unit monitors the availability of egress queues 250(1)-250(M) based on a bitmap received from a receiving transport unit (i.e., 130) and chooses among the available egress queues. In one embodiment, the manner of selection is a strict round-robin technique. Upon selection of an egress queue, egress queue selector unit 240 processes a data stream selected by ingress queue selector unit 230, adds the appropriate overhead information and fills the selected egress queue. Data and header information in an egress queue is a payload data unit (PDU). After filling a selected egress queue, egress queue selector unit 240 then selects a next appropriate available egress queue based upon the selection scheme.

As stated above, the data presented to the egress queues can be in the form of packets. There is a likelihood that an input data packet's boundary may not coincide with the boundary of a PDU. In that case, the input data packet will be split between the PDU currently being formed, up to that PDU's maximum size, and the next PDU to be formed in the next available egress queue. That is, a packet split among PDUs will be split among consecutively formed PDUs.

In the present invention, individual output data transmission lines 270 can operate at differing data rates, and in fact, typically will operate at different data rates. Such a situation occurs, for example, if the output data transmission lines between transport units 120 and 130 negotiate their data rate based upon system conditions. One such variable data rate protocol is SHDSL. As will be discussed further below, SHDSL bandwidth is negotiated by the apparatus at the endpoints of a connection, and is dependent upon the performance of the line with respect to a set of targets such as signal-to-noise ratio. It is standard practice to designate the data rate in terms of "n" 64 kbps sub-channels. In SHDSL, the data rate is negotiated at the time of connection initiation; once a connection is established, the data rate for that connection does not change.

A protocol such as SHDSL is a frame-based protocol. Each frame within that protocol is delimited by a set amount of time (e.g., 6 milliseconds in SHDSL). Since the amount of data transmitted over a set time varies dependent upon the data rate, the amount of data within a frame will vary dependent upon the negotiated data rate.

Each of frame formation units 260(1)-260(M) therefore takes into account the data rate for each of the corresponding output data transmission lines. That is, frames formed by each of frame formation units 260(1)-260(M) will have a unique size that depends upon the data rate of the corresponding output data transmission line. The frame formation units will be configured with data rate information during initialization of the connections between the transport units.

Figure 3:
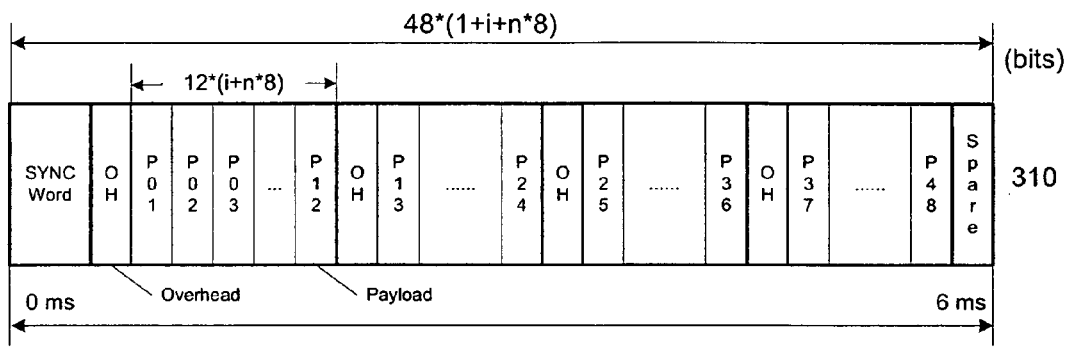
FIG. 3 is a diagram illustrating the components of an SHDSL frame.

FIG. 3 illustrates a sample format of an SHDSL frame. In SHDSL, the frame payload size is 48×n bytes (when there are zero Z-channels). In FIG. 3, the payload blocks are designated P01, P02, . . . , P48. Additionally, there are overhead blocks (OH) as well as synchronization data (SYNC) and reserved area (SPARE).

In the present invention, a number of PDUs inserted into each frame is constant. In one embodiment, the number of PDUs per output frame is six. Since the size of any frame is directly dependent upon the data rate of a corresponding output data transmission line, so too will the PDU size be dependent upon the data rate of the line associated with the SHDSL framer corresponding to the egress queue. For example, if the frame payload size is 48×n bytes and there are 6 PDUs within that frame, then the PDU size is 8×n bytes. A mapping table can be populated with entries corresponding to each egress queue and the size of the PDU sent to that egress queue that depends on the negotiated data rate for the corresponding output data transmission line, as discussed below in connection with FIG. 5.

Once an egress queue has more than one PDU, a PDU is transferred to a frame formation unit corresponding to an egress queue (i.e., egress queue 250(1) transfers data to frame formation unit 260(1)). Each frame is then populated by a set number of PDUs. The resulting frame is then sent out of an appropriate output line card and transmitted to a receiving transport unit (i.e., transport unit 130).

Figure 2B:
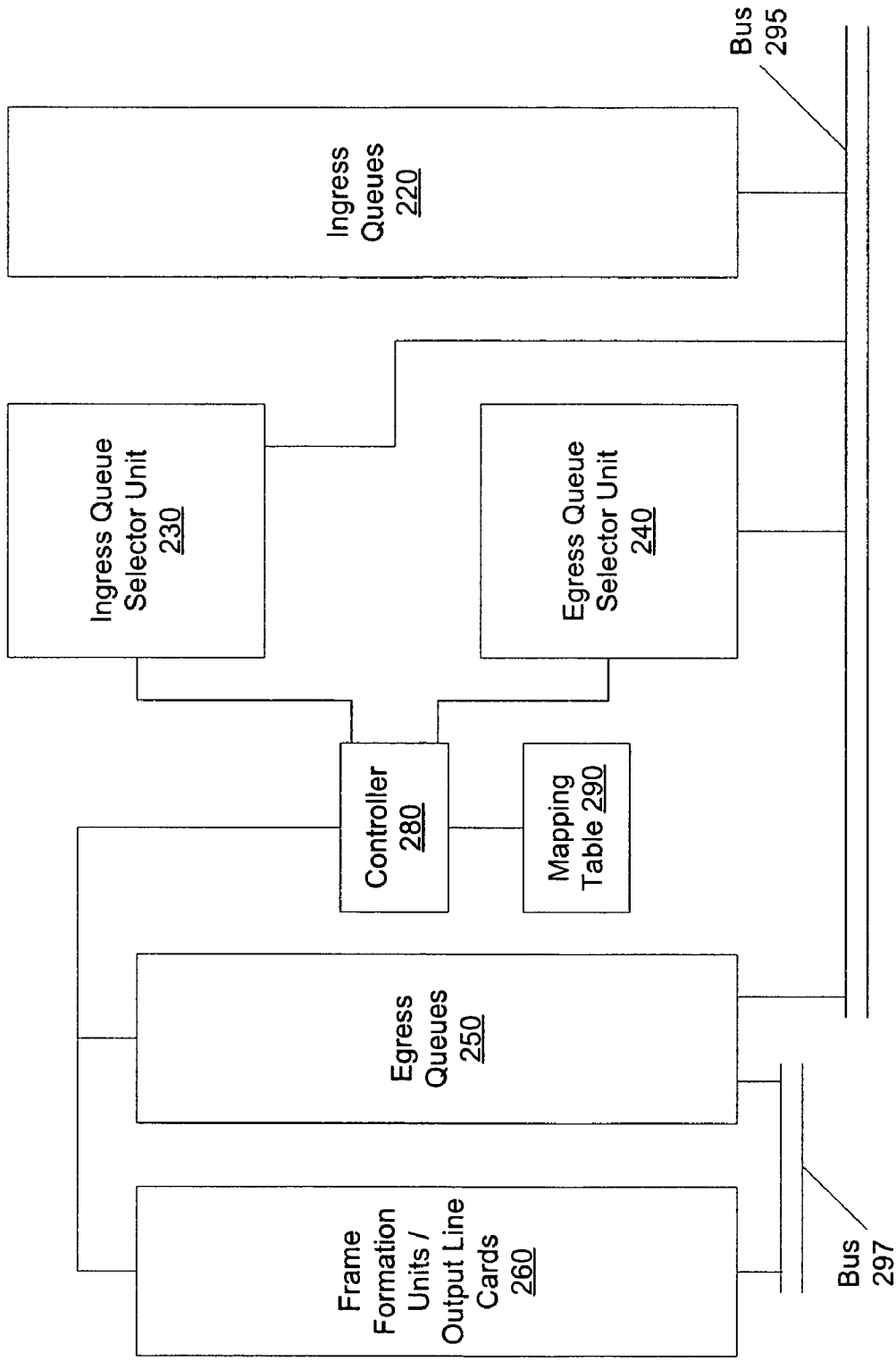
FIG. 2B is a block diagram illustrating data flow of a transmit module of a transport unit according to the present invention.

FIG. 2B depicts data connections within transport unit 200 according to one embodiment of the present invention. A data bus 295 connects ingress queues 220, ingress queue selector unit 230, egress queue selector unit 240 and egress queues 250 to permit data flow between them. As data enters the ingress queues 220, ingress queue selector unit 230 communicates with the ingress queues through the bus and selects from those queues as discussed above. The ingress queue selector unit passes information related to the selected ingress queues through the bus to egress queue selector unit 240.

As discussed above, the egress queue selector unit selects an available egress queue in 250. Controller 280 provides information related to the PDU size of the selected egress queue as determined by the data rate of the corresponding output transmission line. Controller 280 is separately connected to frame formation units 260, egress queues 250, ingress queue selector unit 230, and egress queue selector unit 240. Egress queue selector unit 240 then forms an appropriate header for the PDU, sends that header over bus 295 to the selected egress queue, and also causes the selected ingress queue(s) to transfer data to the selected egress queue over bus 295. Once PDUs are formed, they can be sent to a corresponding frame formation unit 260 over bus 297 for frame formation and transmittal over a corresponding output data transmission line.

The above description is intended as an example of the connections between the various components of a transport unit, but is not intended to limit the types of connections. For example, each egress queue in 250 could be directly connected to a corresponding frame formation unit, rather than being connected through a bus.

Strict-Priority Round-Robin Scheduling

In one embodiment, the ingress queue selector unit implements a strict-priority round-robin (SPRR) technique for data collection and distribution. The purpose of ingress queue selector unit 230 is to collect data from each input (i.e., ingress queues 220(1)-(N)) in strict round-robin priority, starting with ingress queues with the highest priority, and pass this data to the egress queue selector unit, which distributes to active ones of egress queues 250(1)-250(M).

Ingress queue module 220 receives data from ingress queue data streams 210 at data rates that are individually set per input line. This data is buffered in ingress queues 220(1)-(N). Data is collected from ingress queues 220(1)-(N) in strict round-robin fashion starting with the highest priority ones of ingress queues 220(1)-(N). The last one of ingress queues 220(1)-(N) served in each priority is saved at every output time. Then, at the next output time, data collection is started from where the ingress queue selector left off during the last collection event. Thus, all the inputs are equally served at all times in all priorities.

Egress queue selector 240 distributes the input data collected to active egress queues 250(1)-(M). The egress queue selector unit selects egress queues using a strict round-robin scheduling technique. An egress queue is indicated as active by a sub-channel bitmap received from the far-end receive side. If the amount of data to be sent is less than the number of active sub-channels, null data is sent to the remaining channels.

Input to Output Process Flow

Figure 4A:
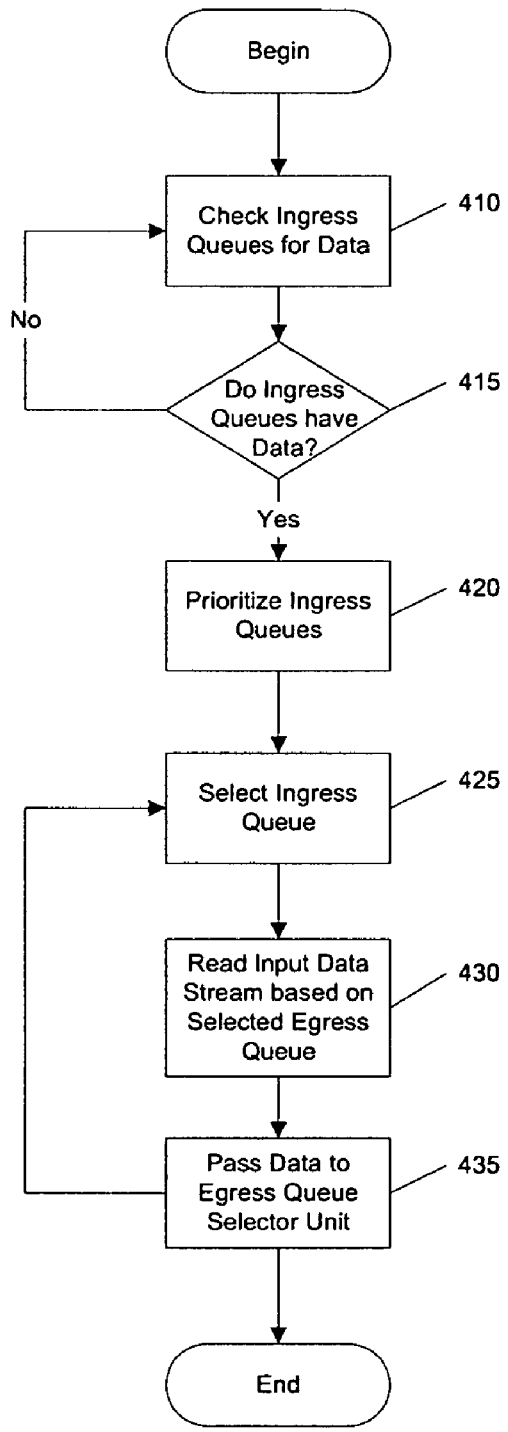
FIG. 4A is a flow diagram of a process of selecting input data queues according to the present invention.
Figure 4B:
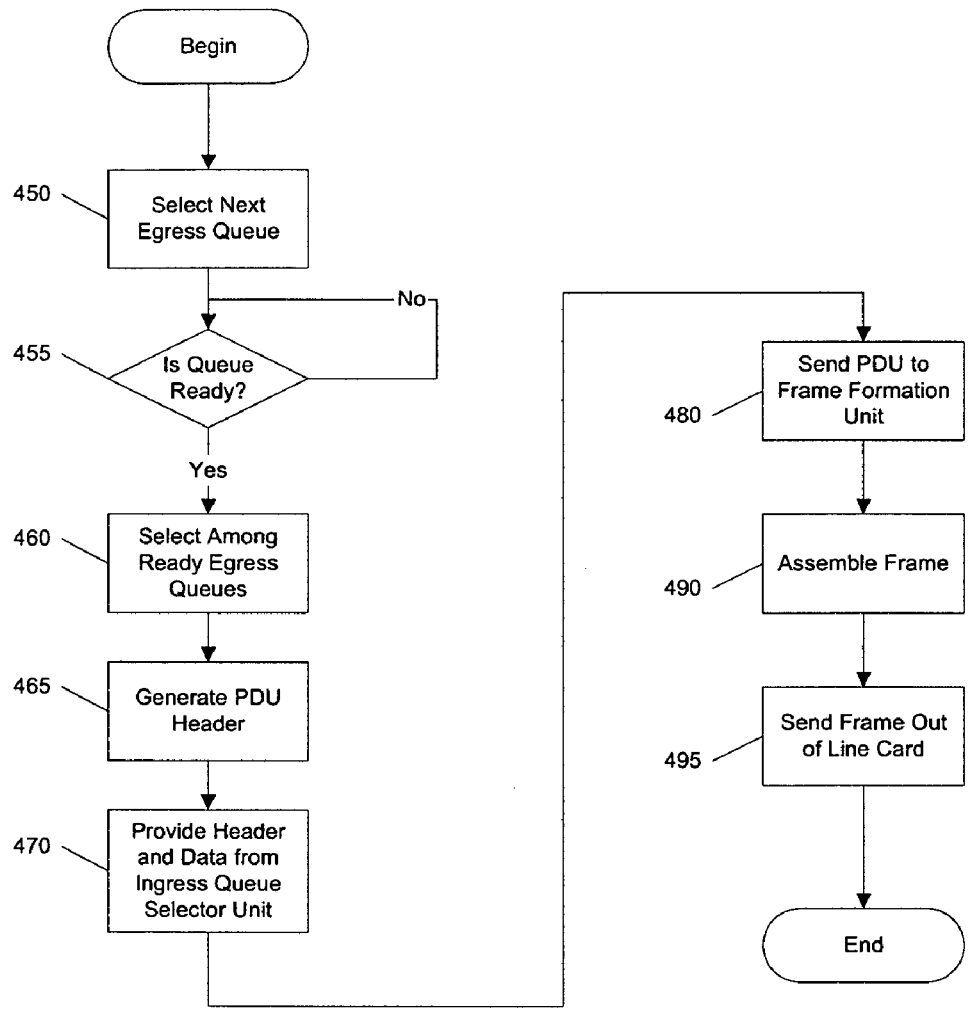
FIG. 4B is a flow diagram of a process for selecting egress queues and forming frames according to the present invention.

FIGS. 4A and 4B depict flow diagrams illustrating processes according to one embodiment of the present invention. FIG. 4A represents a process occurring within ingress queue selector unit 230. FIG. 4B represents a process occurring within egress queue selector unit 240, as well as subsequent egress queues 250 and frame formation units 260.

In FIG. 4A, an ingress queue selector unit checks ingress queues for data (410) and, if there is no data, engages in a loop until data is detected in the ingress queues (415). Once ingress queues begin to fill, an ingress queue selector unit then organizes ingress queues on a priority basis (420). Priority can be determined based on considerations such as data rate provisioned for an incoming data stream and other quality of service required by a data stream. Such prioritizing of the lines can be done, for example, during startup configuration of a transport unit. Once queues are prioritized, an ingress queue selector unit then selects an ingress queue for processing on a strict-priority round-robin basis (425). The data in the ingress queue is then read (430) and can be provided to an egress queue selector unit (435). Alternatively, the data itself may remain in the same memory location, while a pointer to that memory location is passed onto the egress queue selector unit. The amount of data that is selected by the ingress queue selector unit is determined by the PDU size associated with the egress queue selected by the egress queue selector. Once the data (or a pointer thereto) is passed along to the egress queue selector unit, the ingress queue selector unit then proceeds to select the next ingress queue based upon a selection algorithm (e.g., strict-priority round-robin).

An egress queue selector unit may perform its operations at the same time that the ingress queue selector unit is processing. FIG. 4B demonstrates one embodiment of such a process. The egress queue selector unit monitors egress queues (450) and determines whether a particular egress queue is ready to receive data. Once an egress queue is ready, the egress queue selector unit selects among available egress queues using a selection method (e.g., strict round-robin) (460). Once the egress queue selector unit determines the egress queue to send to, the egress queue selector unit then generates a header to be inserted into space reserved at the beginning of each PDU (465). The egress queue selector unit can then begin providing data received from the ingress queue selector unit (470). In the alternative embodiment discussed above, the egress queue selector unit can transfer data from the memory location pointed to by the ingress queue selector unit to an egress queue memory location.

At this point, information in a full egress queue (including header information) constitutes a payload data unit (PDU). This PDU will be of a length determined by the data rate of the output line corresponding to the egress queue.

After a PDU is formed, the PDU is sent to a frame formation unit (480). A frame formation unit then builds an appropriate outgoing frame. In certain embodiments, a frame formation unit builds a frame whose payload contains a set number of PDUs. In one embodiment of the invention, six PDUs are contained within each outgoing frame. A frame formation unit continues to add PDUs to the payload of a frame until that frame is full. As with the PDUs, size of a frame depends upon the data rate of an output line associated with a frame formation unit. Once a frame payload is full, a frame formation unit does the final assembly of a frame by including appropriate header and trailer information (490).

After a frame has been assembled, a frame formation unit sends the frame out of the associated line card (495). A line card provides a physical interface for transmission of framed data along a network between a local transport unit and a remote transport unit. It should be noted that outgoing line cards can be configured to produce data streams using a variety of frame-based protocols, and can be configured to support multiple frame-based protocols and varying bit-rates.

As noted, FIGS. 4A and 4B depict flow diagrams illustrating a process according to one embodiment of the present invention, as do other figures described herein. Operations discussed herein may consist of directly entered commands by a computer system user or by steps executed by software modules or the like, but the preferred embodiment includes steps executed by application specific hardware modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefore may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Overview of SHDSL Protocol

In one embodiment of the present invention, the connection between the local transport unit and the remote transport unit can use a plurality of multi-rate connections using a protocol such as Symmetric High-Bit Rate Digital Subscriber Loop (SHDSL) protocol. SHDSL is designed to transport rate-adaptive symmetrical data across a single copper pair at data rates from 192 kbps to 2.3 Mbps, and adheres to the following standards: International Telecommunication Union (ITU) G.991.2 G.SHDSL, American National Standards Institute (ANSI) TIE1.4/2001-174 G.SHDSL, and European Telecommunications Standards Institute (ETSI) TS101-524 SDSL. SHDSL has the advantage of being able to provide variable bit rate connections over standard copper pairs; thereby decreasing the cost for high bit rate connections.

SHDSL is a channelized protocol. An SHDSL connection has between 3 to 36 channels of 64 kbps bit-rate each (referred to as "B-channels") and up to 7 channels of 8 kbps each (referred to as "Z-channels"). In North America, zero or one Z-channel is allowed, and the Z-channels have generally been reserved for later applications. Therefore, the bandwidth available to a particular SHDSL connection is dependent upon the number of B-channels available. The number of B-channels available to a particular SHDSL connection is determined at the initiation of the connection through a handshaking procedure. Once the handshaking procedure is completed and the number of B-channels determined, that number of B-channels remains the same through the life of the connection. The number of B-channels is generally designated as "n".

In the present invention, multiple variable bit-rate lines can be available between a local transport unit and a remote transport unit. Each one of these lines has an independently negotiated data rate, and therefore there can be varying data rates among the lines. These variances are all reflected in the number of B-channels (n) available to each connection.

SHDSL is a frame-based protocol and FIG. 3 depicts an example of an SHDSL frame. Each frame is 6 milliseconds in duration. Because of the set length in time, the amount of data contained within a frame varies according to the negotiated bandwidth of the connection to which the frame is destined. When the number of Z-channels is zero, the payload section of an SHDSL frame is 48×n bytes long. In addition, there are 48 bits-per-frame used in a SYNC word, overhead, and some spare padding bits. The amount of overhead is fixed regardless of the number of B-channels available in a particular connection.

Mapping of PDUs into an SHDSL Frame

In the present invention, PDUs formed in egress queues are inserted or mapped into SHDSL frames that are then sent between the local transport unit and the remote transport unit. Since each connection between the local and remote transport units can have a variable data rate thus resulting in frames that are of variable bit length, so too are PDUs associated with each output line of a variable data length. The size of each PDU is set such that its duration is constant. In one embodiment of the present invention, that duration is one millisecond. That duration is an even multiple of the payload length of the output frame. In the case of SHDSL in the embodiment mentioned above, six PDUs fit into the payload of one SHDSL frame. Therefore the length of each PDUs is 8×n bytes, where n is the number of Bchannels for the associated SHDSL length.

Figure 5:
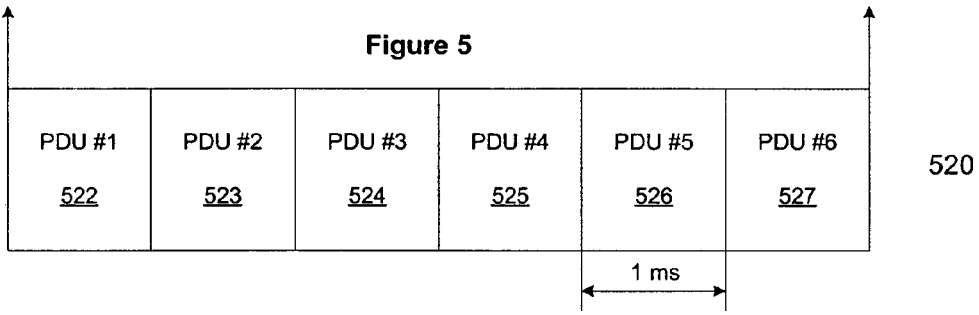
FIG. 5 is a diagram illustrating payload data units formed according to the present invention aggregated into an SHDSL frame.

FIG. 5 shows an example of PDUs (522, 523, 524, 525, 526 and 527) inserted into a payload of an SHDSL frame.

Figure 6:
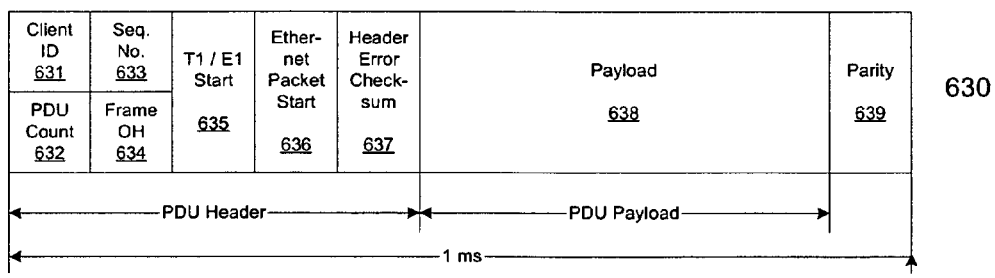
FIG. 6 is a diagram illustrating the components of a payload data unit that may be formed according to the present invention.

As shown in FIG. 6, a PDU header, as inserted by egress queue selector unit 240, typically contains information related to the content of the PDU payload 638. In one embodiment, such header information can include identification of an input port where data was received 631, a sequence of a PDU 633 for possible skew compensation, frame overhead 634, a number of T1/E1 PDUs within a payload area of a PDU 632, starting pointers of T1/E1 PDUs within a PDU payload 635, a number of Ethernet payload bytes within a payload of a PDU 636, and header error correction information 637. There can also be appended parity information 639.

FIG. 7 shows an example of a mapping table usable in the present invention, in a scenario in which the local-to-remote transport unit protocol is SHDSL. The table shows that the length of a PDU and a frame are dependent upon a negotiated n-value. An additional column is present showing the data rate represent by each value of n in a SHDSL connection.

Figure 8:
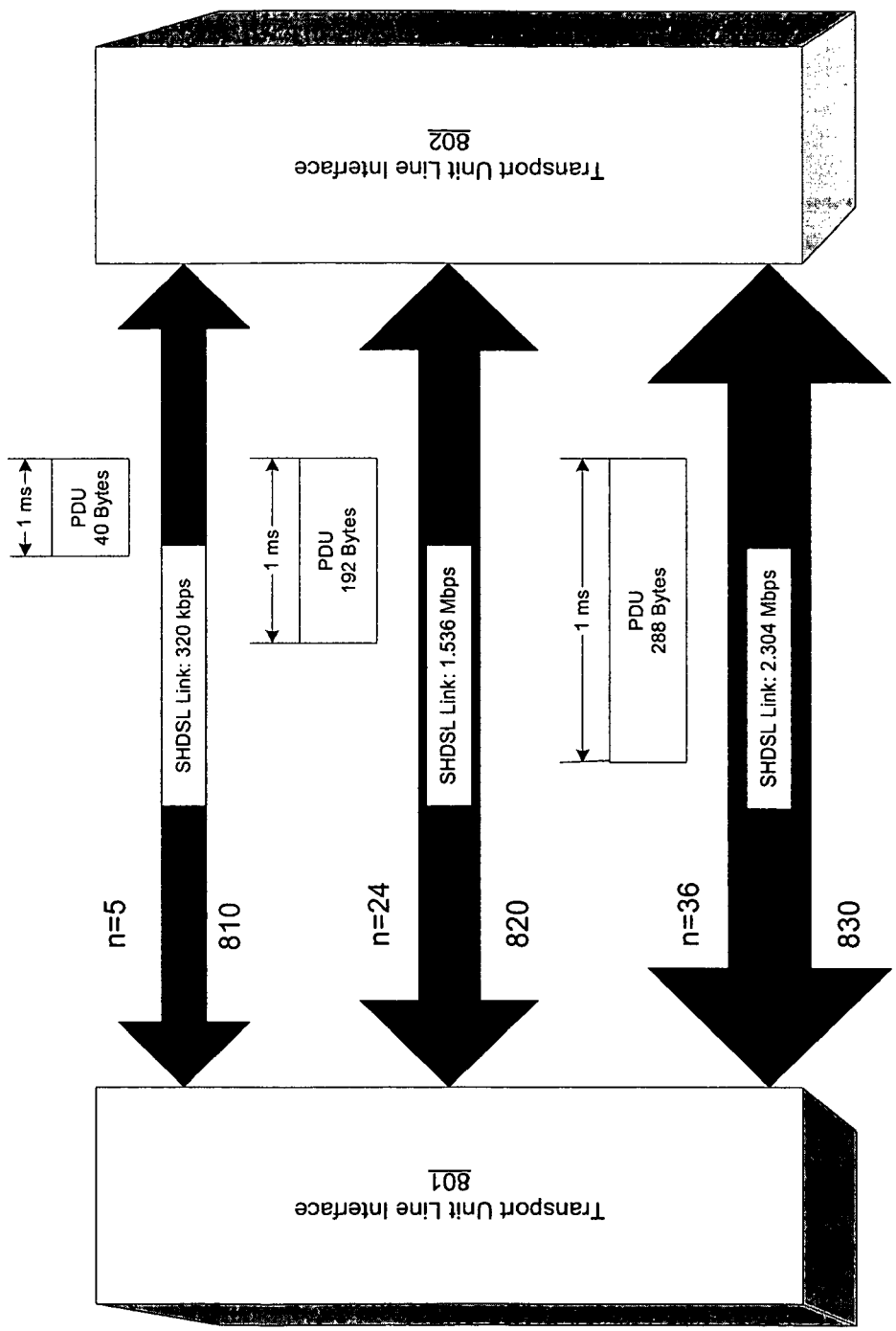
FIG. 8 is a block diagram illustrating the dependence of PDU size upon the data rate or number of SHDSL subchannels according to the present invention.

FIG. 8 is a block diagram showing an example of a simplified set of connections between two transport units 801 and 802 in which there are three SHDSL links of varying data rates (SHDSL links 810, 820, 830). SHDSL link 810 has a data rate of 320 kbps, or an n equal to 5. Thus, PDUs transported by SHDSL link 810 each have 40 bytes of data within them. SHDSL link 820 has a data rate of 1.536 Mbps, or an n equal to 24. In that case, PDUs transported by SHDSL link 820 are 192 bytes long. SHDSL link 830 has a data rate of 2.304 Mbps, or an n equal to 36, resulting in a PDU of 288 bytes.

State Machine Embodiment of Transmit Module

Figure 9:
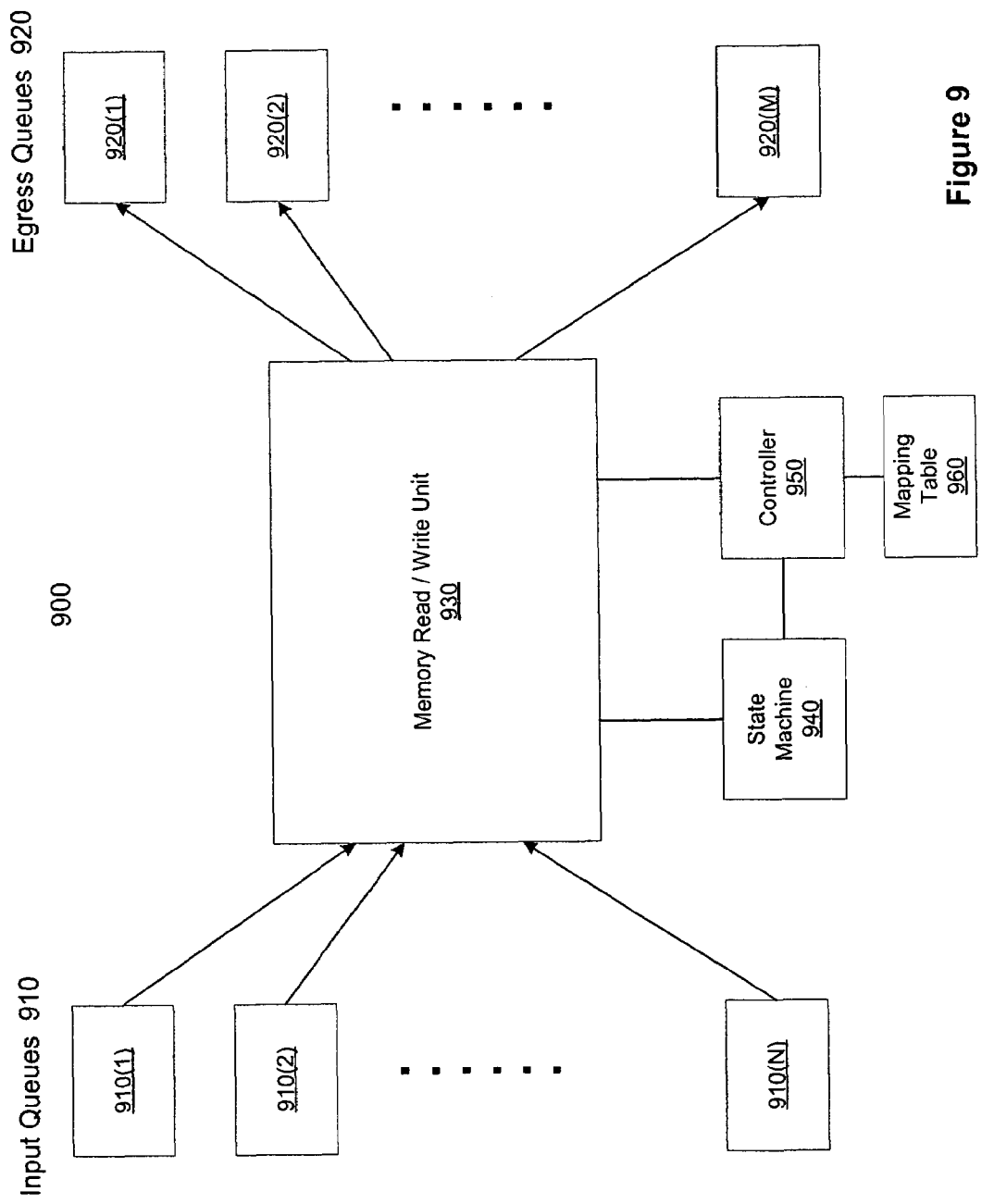
FIG. 9 is a block diagram illustrating components of a transmit module of a transport unit according to the present invention.

FIG. 9 illustrates another embodiment of the present invention. As discussed previously, there are a plurality of ingress queues 910 and egress queues 920. Ingress queues are connected to a number (N) of input lines from a local area network and egress queues are connected to frame format units that are ultimately connected via line cards to a number (M) of network links to a remote transport unit connected to another local area network. As also discussed previously, the network links may be variable data rate links, and those data rates may be negotiated at the time of link initialization (as in SHDSL).

A memory read/write unit 930 coupled with a state machine 940 handles a task of reading data from ingress queues and passing that data along to egress queues, wherein the PDUs are formed. The state machine therefore has two general stages: selection of and reading from ingress queues, and selection of and passing data on to egress queues.

The state machine selects an available egress queue to which data will be sent. The state machine first determines the condition of the various line card ports using a desired selection scheme. If an egress queue is available and ready, the state machine selects the egress queue and informs a controller 950. Controller 950 then allocates an amount of memory space for PDU formation in the memory read/write unit appropriate to the selected egress queue. In one embodiment, a memory in which PDU formation takes place is located within the memory read/write unit itself. In another embodiment, a memory for PDU formation may be separate from the memory read/write unit but accessed by the memory read/write unit (i.e., either in the egress or ingress queues, or in a separate memory unit). As stated above, this is necessary because each line associated with each egress queue may have a different data rate dependent upon either negotiation (in the case of SHDSL) or the lines having predefined data rates. A mapping table 960 can store the data rate/size information referenced by the controller. Of the reserved memory space, a certain number of bits is typically reserved in the leading portion of the space reserved for the PDU, in order to allow a PDU header to be assembled.

Next, the state machine determines the empty status of the ingress queues with consideration for the priority level of each ingress queue. Different types of input data streams can require different handling (i.e., frame-based versus packet-based data streams) and can also require the prioritizing of one group of inputs over another group. Further, prioritizing of each input port within a type of input ports may be instituted. The state machine determines whether queues are empty and if not, whether these queues are ready to be served based upon their relative priority to other queues that are also not empty.

Once a queue has been selected to for service, the state machine then determines how many bytes remain to be filled in the PDU currently being assembled within the memory read/write unit. All or some of the data in the selected ingress queue is then transferred to the memory read/write unit. The state machine then continues selecting ingress queues and moving the input data into the memory read/write unit, until a PDU is filled.

The state machine will then cease gathering input data. At this point, the state machine generates a header that appropriately describes the data contained within a PDU, and inserts that header in reserved leading bits within the memory read/write. A PDU is then transferred out of the memory read/write unit, to a frame formation unit corresponding to the selected egress queue. The state machine then selects another egress queue, and the process is repeated with that egress queue.

Receive Module Example

Figure 10:
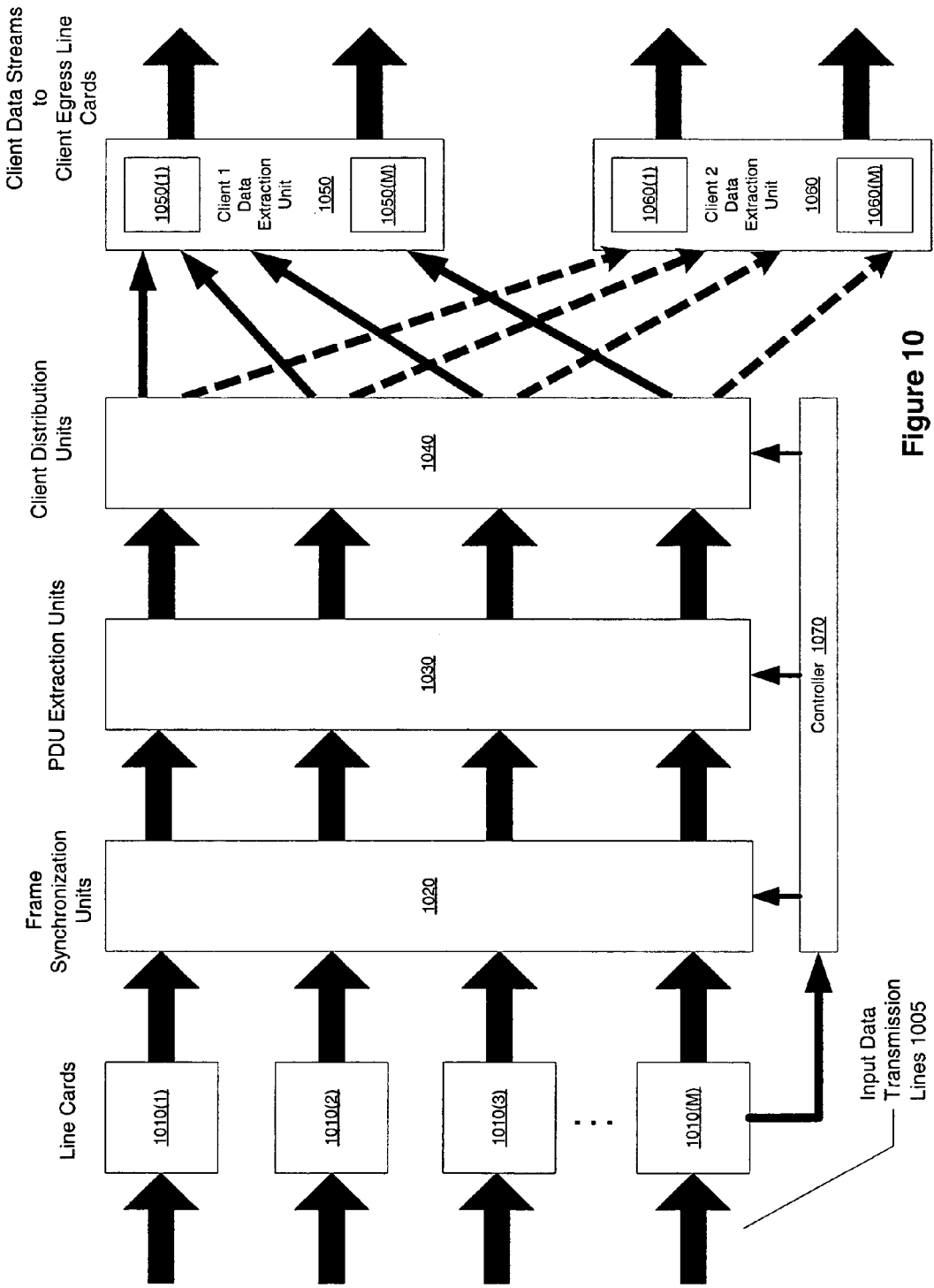
FIG. 10 is a block diagram illustrating components of a receive module of a transport unit according to the present invention.

FIG. 10 illustrates a block diagram of a receive module of the present invention. A group of input data transmission lines 1005 are connected to a corresponding group of input line cards 1010(1)-(M). Input data transmission lines 1005 correspond to output data transmission lines 270 in FIG. 2. Input line cards 1010(1)-(M) are responsible for receiving data transmitted by output line cards 260(1)-(M) in FIG. 2. In a negotiated data rate environment, each of input line cards 1010(1)-(M) also negotiate a data rate with output line cards 260(1)-(M). The line cards provide negotiated data rates of the input data transmission lines to the controller 1070.

As discussed with regard to the transmit portion of the transport units, data rate of the various input data transmission lines determines the amount of data found in each frame received by the input line cards and also the amount of data in the PDUs populating each frame. Therefore, each input line card provides received frames to a frame synchronization unit 1020. A frame synchronization unit 1020 can control the data flow from the input line cards and can ensure that frames are properly aligned prior to sending data to subsequent modules.

Once a complete frame is ready, a PDU extraction unit 1030 processes the framed data. The PDU extraction unit can strip a frame header and other frame overhead, and then determines the boundaries of each PDU within a frame's payload. The PDU extraction unit needs to know the size of the PDUs to be extracted, which is dependent upon the data rate of an input data transmission line, and again the transmission rate information is provided by the controller 1070 and correlated to line identification information associated with a frame.

Extracted PDUs are then processed by a client distribution unit 1040. The client distribution unit must also know the size of the PDUs and receives that information from controller 1070. A client distribution unit can then read a header of a PDU and determine what type of client information is contained within the PDU (i.e., Ethernet, TDM or both) and distribute data in a PDU payload to an appropriate client data extraction unit (i.e., 1050(1)-(M) or 1060(1)-(M)). A client distribution unit can further read PDU headers to determine the proper order to send PDUs to the appropriate distribution unit, and combine the data in the PDU payloads prior to sending the data to a client data extraction unit. A client distribution unit can also read a PDU header to determine a destination client egress data line (not shown) upon which the data ultimately must go, and can send that information to the appropriate client data extraction unit.

Client data extraction units 1050(1)-(M) and 1060(1)-(M) gather extracted data from the client distribution units and send the data to an appropriate client egress line card in the client's native format. The output client data stream is a faithful reproduction of the input data streams 210 to the transmit unit 200.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A method for transmitting data comprising:
forming a payload data unit (PDU) from an input data stream, wherein an amount of data within the PDU is dependent upon a data rate of an output transmission line, wherein the line includes a plurality of B channels; and forming an SHDSL output frame form said PDU, wherein the output frame comprises a fixed number of PDUs, and the fixed number of PDUs is a constant that is independent of the data rate, where the length of each PDUs is 8×n bytes, where n is the number of B channels corresponding to said output data transmission line.

2. The method of claim 1 further comprising:
negotiating the data rate of the output transmission line.

3. The method of claim 1 further comprising:
selecting the output data transmission line from a plurality of output data transmission lines using a round-robin scheduling methodology.

4. The method of claim 1 further comprising:
forming an output frame from a plurality of said PDUs, wherein the amount of data within the output frame is dependent upon the data rate of the output data transmission line.

5. The method of claim 4 further comprising:
forming a plurality of said output frames, wherein each of said output frames contains the same number of PDUs.

6. An apparatus for transmitting data comprising:
means for forming a payload data unit (PDU) from an input data stream, wherein an amount of data within the PDU is dependent upon a data rate of an output data transmission line, wherein the line includes a plurality of B channels; and means for forming and output SHDSL frame from said PDU, wherein the output frame comprises a fixed number of PDUs, and the fixed number of PDUs is a constant that is independent of the data rate, where the length of each PDUs is 8×n bytes, where n is the number of B channels corresponding to said output data transmission line.

7. The apparatus of claim 6 further comprising:
means for negotiating the data rate of the output data transmission line.

8. The apparatus of claim 6 further comprising:
means for selecting the output data transmission line from a plurality of output data transmission lines using a round-robin scheduling methodology.

9. The apparatus of claim 6 further comprising:
means for forming an output frame from a plurality of said PDUs, wherein the amount of data within the output frame is dependent upon the data rate of the output data transmission line.

10. The apparatus of claim 9 further comprising:
means for forming a plurality of said output frames, wherein each of said output frames contains the same number of PDUs.

11. A computer-readable storage medium comprising:
a first set of instructions, executable by a processor, configured to form a payload data unit (PDU) from an input data stream, wherein an amount of data within the PDU is dependent upon a data rate of an output data transmission line, wherein the line includes a plurality of B channels; and a second set of instructions, executable by the processor, configured to form an output SHDSL frame from said PDU, wherein the output frame comprises a fixed number of PDUs, and the fixed number of PDUs is a constant that is independent of the data rate, where the length of each PDUs is 8×n bytes where n is the number of B channels corresponding to said output data transmission line.

12. The computer-readable store medium of claim 11 further comprising:
a third set of instructions, executable by the processor, configured to negotiate the data rate of the output data transmission line.

13. The computer-readable store medium of claim 11 further comprising:
a third set of instructions, executable by the processor, configured to select the output data transmission line from a plurality of output data transmission lines using a round-robin scheduling methodology.

14. The computer-readable store medium of claim 11 further comprising:
a third set of instructions, executable by the processor, configured to form an output frame from a plurality of said PDUs, wherein the amount of data within the output frame is dependent upon the data rate of the output data transmission line.

15. The computer-readable store medium of claim 14 further comprising:
a third set of instructions, executable by the processor, configured to form a plurality of said output frames, wherein each of said output frames contains the same number of PDUs.

16. A transport unit comprising:
a payload data unit (PDU) formation unit configured to form a PDU, wherein the PDU comprises data, wherein the data is of an amount that depends upon a data rate of an output data transmission line, wherein the line includes a plurality of B channels; and a frame formation unit, coupled to the PDU formation unit, and configured to form a SHDSL frame from said PDU, wherein the frame comprises a fixed number of PDUs, and the fixed number of PDUs is a constant that is independent of the data rate, where the length of each PDUs is 8×n bytes where n is the number of B channels corresponding to said output data transmission line.

17. The transport unit of claim 16, wherein:
the PDU formation unit comprises a data egress queue configured to hold an amount of data dependent upon a maximum data rate of the output data transmission line.

18. The transport unit of claim 17 further comprising:
the frame formation unit is coupled to the data egress queue.

19. The transport unit of claim 17, wherein:
the data egress queue is one of a plurality of data egress queues, and a first queue selector unit is configured to select data egress queues using a round-robin scheduling methodology.

20. The transport unit of claim 16 further comprising:
a plurality of ingress queues, wherein each ingress queue is coupled to an input data line, and configured to receive a data stream; and a second queue selector unit coupled to the ingress queues, wherein the second queue selector unit transmits data related to the data stream to the first queue selector unit.

21. The transport unit of claim 20, wherein the second queue selector unit selects an ingress queue using a strict-priority round-robin scheduling methodology.

22. The transport unit comprising:
a plurality of egress queues, wherein a length of space used to store data within each egress queue is based on a data rate of an output data transmission line corresponding to each egress queue, wherein the line includes a plurality of B channels; and an egress queue selector unit, wherein the egress queue selector unit is configured to select one of the plurality of egress queues, and transmit a quantity of data from a data stream sufficient to fill the length of space used to store data within the egress queue selected; a frame formation unit coupled to each of the egress queues, wherein the frame formation unit receives all of the data from an associated egress queue, and the frame formation unit generates a SHDSL frame of a length dependent upon the data rate of the output data transmission line of the output line corresponding to the egress queue, where a length of each PDUs is 8×n bytes, where n is the number of B channels corresponding to said output data transmission line.

23. The transport unit of claim 22, wherein the data rate of the output data transmission line is negotiated.

24. The transport unit of claim 22, wherein the egress queue selector unit selects an egress queue suing a round-robin scheduling methodology.

25. The transport unit of claim 22, wherein the frame generated by the frame formation unit comprises:
a multiple of data from the egress queue.

26. The transport unit of claim 25, wherein each frame generated by each frame formation unit comprises:
the same multiple of data from the egress queue.

27. The transport unit of claim 22, wherein the egress queue selector unit is further configured to determine the available space in the selected egress queue by referring to a mapping table.

28. The transport unit of claim 27, wherein the mapping table contains reference to the number of channels (n) negotiated for each output transmission line.

29. The transport unit of claim 28, wherein the length of each egress queue is equal to (8*n) bytes.

30. The transport unit of claim 28, wherein the frame formation unite forms frames with a payload length of (48*n) bytes.

31. The transport unit of claim 22, wherein the egress queue selector unit is further configured to:
transmit a header to the selected egress queue, wherein the header is placed at an address in the selected egress queue ahead of the quantity of data from the data stream.

32. The transport unit of claim 31, wherein the egress queue associates the header with the quantity of data within the egress queue to form a payload data unit (PDU).

33. The transport unit of claim 22 further comprising:
one or more ingress queues, wherein each ingress queue is coupled to an input data line, and configured to receive a data stream; and an ingress queue selector unit coupled to the ingress queues, wherein the ingress queue selector unit is configured to select an ingress queue using a strict-priority round-robin scheduling methodology, and transmit data related to the data stream of the ingress queue selected to the egress queue selector unit.

34. The transport unit comprising:
a network interface unit coupled to an output data transmission line; and a mapping table unit, coupled to the network interface unit, and configured to store a mapping table comprising a first value and a second value, wherein the first value is a data rate of the output data transmission line, and the second value is an amount of data within a payload data unit (PDU) destined for the output data transmission line, wherein the line includes a plurality of B channels; a plurality of frame formation units, wherein each of the frame formation units is coupled to the output data transmission line having a negotiated rate of output data transmission and coupled to a corresponding data egress queue, wherein each frame formation unit forms SHDSL frames, where a length of each PDUs is 8×n bytes, where n is the number of B channels corresponding to said output data transmission line.

35. The transport unit of claim 34 further comprising:
a PDU formation unit coupled to the mapping table, configured to form a plurality of PDUs from a data stream, wherein the amount of data within each of the PDUs is determined by reference to the mapping table.

36. The transport unit of claim 35, wherein the PDU formation unit comprises:
a plurality of data egress queues, wherein the amount of data stored in each of the data egress queues is determined by reference to the mapping table.

37. The transport unit of claim 36, wherein the mapping table associates the amount of data in a PDU in direct proportion to a negotiated number of SHDSL channels for each output data transmission line.

38. The transport unit of claim 36 further comprising:
a first queue selector unit coupled to the egress queues, wherein the first queue selector unit is configured to use a scheduling methodology to select an egress queue, and couple the data stream to the selected egress queue.

39. The transport unit of claim 35 further comprising:
one or more ingress queues, wherein each ingress queue is coupled to an input data line, and configured to receive a data stream; and a second queue selector unit coupled to the ingress queues, wherein the second queue selector unit is configured to select an ingress queue using a scheduling methodology, and transmit data related to the selected input queue to the first queue selector unit.

* * * * *